Patented Nov. 12, 1935

2,020,650

UNITED STATES PATENT OFFICE 2,020,650

THIAZOLE SUBSTITUTED BY A PRIMARY ALKYLAMINO GROUP

Treat B. Johnson, Bethany, Conn., assignor to Winthrop Chemical Company, Inc., New York, N. Y., a corporation of New York No Drawing. Application August 18, 1932, Serial No. 629,398

5 Claims. (Cl. 260—44)

In my copending application Serial No. 629,397, filed August 18, 1932, I have described and claimed the products of the general Formula I, which are obtainable by the following reaction:

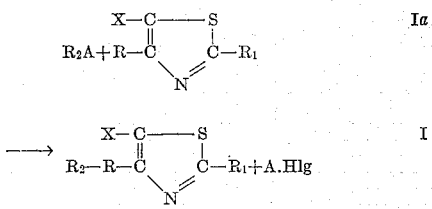

The intermediate products of the general formula Ia are obtainable by a reaction between a ketone having in its tautomeric enol form the general formula:

$$\begin{array}{c} X-C-Hlg \\ \parallel \\ R-C-OH \end{array}$$

wherein R stands for a halogenated aliphatic radical which may be substituted by aryl radicals, and wherein X stands for hydrogen or alkyl or aryl or aralkyl, and wherein Hlg stands for either chlorine, bromine or iodine, and a thioamide compound containing the grouping

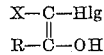

as has been described and claimed in my copending application Serial No. 629,396.

In the above general Formulæ I and Ia $R_1$ may represent a large variety of organic radicals such as alkyl, hydroxyalkyl, alkoxy alkyl, aryl, aralkyl, alkyl substituted aryl, hydroxyaryl, alkoxy aryl; the aryl radical standing alone or in any of the combinations above enumerated may be substituted by various radicals such as hydroxyl, bromine, chlorine, iodine, O-alkyl. More specifically $R_1$ may represent the phenyl group which may contain one or more free or substituted hydroxy groups, which hydroxy groups may be in ortho-, meta- or para-position. $R_2A$ stands for a compound which has at least one reactive hydrogen or alkali metal atom designated as A. R stands for a halogenated aliphatic radical and X for either H, or alkyl, aryl or aralkyl.

In particular, when $R_2A$ in the above general Formula Ia stands for an alkali metal salt of an organic compound containing carboxylic acid groups, and also containing a methylene group, both hydrogen atoms of which, designated as A, are reactive, such compound being, for instance, an alkali metal salt of an ester of malonic acid and of higher homologues thereof, or of a β-ketocarbonic acid ester containing a methylene group as above characterized, such compound being, for instance, aceto acetic acid, and when $R_1$ stands for a phenyl radical which may contain one or more free or substituted hydroxy groups and which hydroxy groups may be in ortho-, meta- or para-position, the respective compounds I obtainable by the above reaction will be characterized by the following constitution:

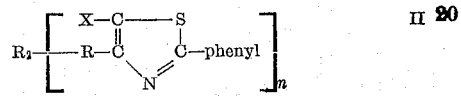

wherein R has the above given signification, and wherein X stands for either hydrogen, or alkyl, aryl or aralkyl, and wherein $n$ stands for one of the numbers 1 and 2, and wherein $R_2$ stands for a radical of an organic compound containing carboxylic acid groups and containing a methylene group both hydrogen atoms of which are reactive, and at least one of which hydrogen atoms has been eliminated by the formation of a linkage between a carbon atom of an aliphatic radical R and the carbon atom of the methylene group.

As an example, 2-phenylthiazole-4-methyl malonic acid of the formula:

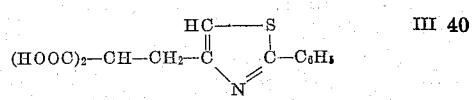

may be mentioned; it has been described in my copending application Serial No. 629,397, filed August 18, 1932.

I have now found that these malonic acid derivatives of 4-methylthiazoles can be converted by a number of conventional steps into amines of the following general formula:

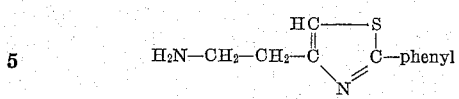

in which the phenyl radical may contain one or more free or substituted hydroxy groups, which hydroxy groups may be in ortho-, meta- or para-position. Such compounds are bases of the phenylethylamine type

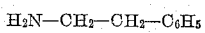

in which the aliphatic part is linked to the benzene nucleus by the thiazole ring. It is known that this nucleus and the side-chain substitutions in a base of the Type V above bring about physiological effects leading to products of therapeutical value.

I have now found that also the amines of the Type IV are substances of decided pharmaceutical value.

The following examples illustrate the process of preparing the amines of the Type IV and the products thus obtainable.

*Nomenclature and constitution (T=the thiazole nucleus)*

I. 2-phenylthiazole-4-β-propionic acid

II. Ethyl 2-phenylthiazole-β-propionate

III. 2-phenylthiazole-4-β-propionhydrazide

IV. 2-phenylthiazole-4-β-propionazide

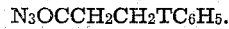

V. Di-(2-phenylthiazole-4-ethyl)-sym.-urea

VI. 2-phenylthiazole-4-ethyl-phthalimide

VII. 2-phenylthiazole-4-ethylamine

*Experimental data*

| Number | M. P. °C. | B. P. °C. | Crystal form | Nitrogen | |
|---|---|---|---|---|---|
| | | | | Calcd. | Found |
| I | 83–84 | | Needles | 6.01 | 6.06 |
| II | 42–43 | 170–171 (3–4 mm.) | Prisms | 5.36 | 5.35 |
| III | 142–143 | | Prisms | 17.01 | 17.3  17.4 |
| IV | 72 | | Needles | | |
| V | 176–177 | | Plates | 12.90 | 12.84 |
| VI | 113–114 | | | 8.38 | 8.24  8.34 |
| VII | Hydrochloride, M. P. 91–92 °C. | 146–147 (2–3 mm.) | | 13.72 | 13.71  13.67 |

Example 1

*2-phenylthiazole-4-ethylamine*

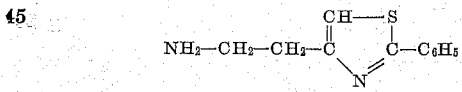

This compound is prepared by the following course of reactions:

2-Phenylthiazole-4-methyl-malonic acid heated to its melting point yields under evolution of carbon dioxide 2-phenylthiazole-4-β-propionic acid. This acid is esterified with ethyl alcohol yielding ethyl 2-phenylthiazole-4-β-propionate. The ester is digested in alcohol with a slight excess of 40% hydrazine hydrate solution yielding 2-phenylthiazole-4-β-propion-hydrazide. The hydrazide is converted into the corresponding 2-phenylthiazole-4-β-propionazide by diazotation in glacial acetic acid solution. By warming the azide in dilute acetic acid solution, di-(2-phenylthiazole-4-ethyl)-sym. urea is obtained. The urea compound is heated with phthalic anhydride to higher temperature as long as carbon dioxide is evolved yielding 2-phenylthiazole-4-ethyl-phthalimide. The phthalimide is then digested in alcohol with 40% hydrazine hydrate solution and the 2-phenylthiazole-4-ethylamine of the above structural formula is obtained.

In the following table are given for convenience the physical and analytical data for the intermediate products mentioned above and for the end product 2-phenylthiazole-4-ethylamine.

Example 2

*Di-(2-phenylthiazole-4)-1,3-isopropylamine*

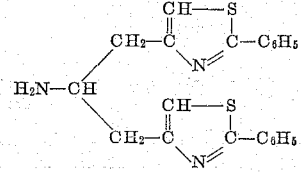

This compound is prepared by applying the course of reactions described in Example 1 to di-(2-phenylthiazole-4-methyl)-malonic acid. The physical properties of the intermediate products and of the resulting end product di-(2-phenylthiazole-4)-1,3-isopropylamine are described in the following table in which also the analytical data are given:

*Nomenclature and constitution (T=the thiazole nucleus)*

I. Ethyl di-(2-phenylthiazole-4-methyl)-acetate (C₂H₅OOC)CH(CH₂TC₆H₅)₂.

II. Di-(2-phenylthiazole-4-methyl)-acetic acid HOOCCH(OH₂TC₆H₅)₂.

III. Di-(2-phenylthiazole-4-methyl)-acethydrazide H₂NNHCOCH(CH₂TC₆H₅)₂.

IV. Di-(2-phenylthiazole-4-methyl)-acetazide N₃OCCH(CH₂TC₆H₅)₂.

V. Tetra-(2-phenylthiazole-4)-1,3-isopropyl urea (C₆H₅TCH₂)₂CHNHCONHCH(CH₂TC₆H₅)₂.

VI. Di-(2-phenylthiazole-4)-1,3-isopropyl-phthalimide C₆H₄(CO)₂NCH(CH₂TC₆H₅)₂.

VII. Di-(2-phenylthiazole-4)-1.3-isopropyl-amine H₂NCH(CH₂TC₆H₅)₂.

VII. 2-p-methoxyphenylthiazole-4-ethylamine NH₂CH₂CH₂TC₆H₄OCH₃.

*Experimental data*

| Number | M. P. °C. | B. P. °C. | Crystal form | Nitrogen | |
|---|---|---|---|---|---|
| | | | | Calcd. | Found |
| I | 61.5-62 | 272 at 2-3 mm | Needles | 6.45 | 6.55 |
| II | 127-128 | | Needles | 6.89 | 6.81 |
| III | Hydrochloride 235-238 | | Prisms | | |
| IV | 80 | | | 10.76 | 10.57  10.62 |
| V | 182-183 | | Prisms | 8.28 | 8.24  8.22 |
| VI | 158-159 | | Plates | Cl. 21.89 | Cl. 21.94 |
| VII | Hydrochloride 235-238 | | Needles | | |

VIII. 2-p-hydroxyphenylthiazole-4-ethylamine H₂NCH₂CH₂TC₆H₄OH.

*Experimental data*

| Number | M. P. °C. | B. P. °C. | Crystal form | Nitrogen | |
|---|---|---|---|---|---|
| | | | | Calcd. | Found |
| I | 126-127 | | Needles | 5.32 | 5.28 |
| II | 53-54 | | | 4.81 | 4.90 |
| III | 158-159 | | Needles | 15.17 | 15.20 |
| IV | 78-79 | | | | |
| V | 173-174 | | Prisms or plates | 11.35 | 11.30 |
| VI | 120-121 | | Needles | 7.69 | 7.63 |
| VII | | 292-293 (3-4 mm.) | | | |
| VIII | Hydrochloride 218-222 | | | Chlorine, 24.19 | Chlorine, 23.85 |

EXAMPLE 3

*2-p-hydroxyphenylthiazole-4-ethylamine*

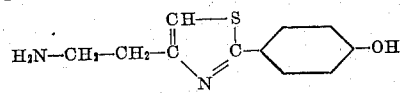

By applying the course of reactions as described in Example 1 to 2-p-methoxyphenylthiazole-4-methyl malonic acid, 2-p-methoxyphenylthiazole-4-ethylamine is obtained which upon treating with 48% hydrobromic acid by refluxing during 3 hours yields 2-p-hydroxyphenylthiazole-4-ethylamine. It was isolated in form of the hydrochloride. The physical properties of the intermediate products and of the end product hydrochloride of 2-p-hydroxyphenylthiazole-4-ethylamine are described in the following table in which also the analytical data are given:

*Nomenclature and constitution (T=the thiazole nucleus)*

I. 2-p-methoxyphenylthiazole-4-β-propionate HOOCCH₂CH₂TC₆H₄OCH₃.

II. Ethyl-2-p-methoxyphenylthiazole-4-β-propionate C₂H₅OOCCH₂CH₂TC₆H₄OCH₃.

III. 2-p-methoxyphenylthiazole-4-β-propionhydrazide H₂NNHCOCH₂CH₂TC₆H₄OCH₃.

IV. 2-p-methoxyphenylthiazole-4-β-propionazide N₃COCH₂CH₂TC₆H₄OCH₃.

V. Di-(2-p-methoxyphenylthiazole-4-ethyl)-sym.-urea
CH₃OC₆H₄TCH₂CH₂NH
            CONHCH₂CH₂TC₆H₄OCH₃.

VI. 2-p-methoxyphenylthiazole-4-ethyl phthalimide C₆H₄(CO₂)NCH₂CH₂TC₆H₄OCH₃.

EXAMPLE 4

*2-(3,4-dimethoxyphenylthiazole)-4-ethylamine*

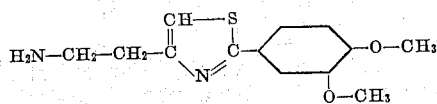

This compound is prepared by applying the course of reactions as described in Example 1 to 2-(3,4-dimethoxyphenylthiazole-4-methyl) malonic acid. The physical properties of the intermediate products and of the resulting end product 2-(3,4-dimethoxyphenylthiazole)-4-ethylamine are described in the following table in which also the analytical data are given:

*Nomenclature and constitution (T=the thiazole nucleus)*

I. 2-(3,4-dimethoxyphenylthiazole)-4-β-propionic acid HOOCCH₂CH₂TC₆H₃(OCH₃)₂.

II. Ethyl-2-(3,4-dimethoxyphenylthiazole)-4-β-propionate C₂H₅OOCCH₂CH₂TC₆H₃(OCH₃)₂.

III. 2-(3,4-dimethoxyphenylthiazole)-4-β-propionhydrazide H₂NNHCOCH₂CH₂TC₆H₃(OCH₃)₂.

IV. 2-(3,4-dimethoxyphenylthiazole)-4-β-propionazide N₃COCH₂CH₂TC₆H₃(OCH₃)₂.

V. Di-2-(3,4-dimethoxyphenylthiazole)-4-ethyl-sym.-urea (CH₃O)₂C₆H₃TCH₂CH₂NH
            CONHCH₂CH₂TC₆H₃(OCH₃)₂.

VI. 2-(3,4-dimethoxyphenylthiazole)-4-ethyl phthalimide $C_6H_4(CO)_2NCH_2CH_2TC_6H_3(OCH_3)_2$.

VII. 2-(3,4-dimethoxyphenylthiazole)-4-ethyl-amine $NH_2CH_2CH_2TC_6H_3(OCH_3)_2$.

*Experimental data*

| Number | M. P. ° C. | B. P. ° C. | Crystal form | Nitrogen | |
|---|---|---|---|---|---|
| | | | | Calcd. | Found |
| I | 94 | | | | |
| II | 69 | 220-223 (3 mm.) | Needles | 4.78 | 4.74 |
| III | 162 | | Needles | 4.36 | 4.39 |
| IV | 77-78 | | Needles | 14.0 | 13.8 |
| V | 165-166 | | | | |
| VI | 143-144 | | Plates | 10.11 | 10.00 |
| VII | Di-hydrochloride 225-227 | Base 210-212 (4 mm.) | Needles | 7.11 10.6 Cl. 21.03 | 7.03 10.5 20.75 |

I claim:

1. The thiazole compounds of the general formula:

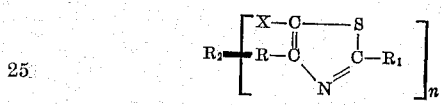

wherein R stands for an aliphatic radical which may be substituted by a phenyl radical, and wherein X represents either hydrogen or alkyl, or benzyl, and wherein $R_1$ stands for an organic radical selected from the group consisting of phenyl, benzyl, lower alkyl substituted phenyl, hydroxy phenyl, lower alkoxy phenyl, alkyl, lower hydroxy alkyl and lower alkoxy alkyl, and wherein $n$ stands for one of the numbers 1 and 2, and wherein $R_2$ stands for an alkyl group which contains a $NH_2$ group, said compounds generally being well crystallized in the form of their hydrochloric acid salts.

2. The thiazole compounds of the general formula:

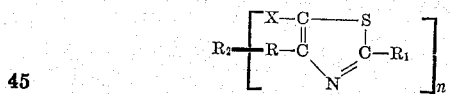

wherein R stands for an aliphatic radical which may be substituted by a phenyl radical, and wherein X represents either hydrogen or alkyl, or benzyl, and wherein $R_1$ represents the phenyl radical which may contain one or more free or alkyl substituted hydroxyl groups, which hydroxyl groups may be in ortho-, meta- or para-position, and wherein $n$ stands for one of the numbers 1 and 2, and wherein $R_2$ stands for an alkyl group which contains a $NH_2$ group, said compounds generally being well crystallized in the form of their hydrochloric acid salts.

3. 2-phenylthiazole-4-ethylamine of the formula:

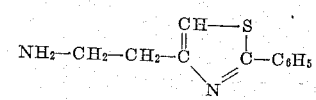

which boils at 146-147° C. under a pressure of 2-3 mm. and the hydrochloric acid salt of which melts at 91-92° C.

4. Di-(2-phenylthiazole-4)-1,3-isopropylamine of the formula:

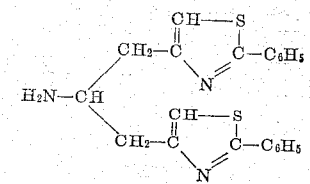

which boils at 235-238° C. and the hydrochloric acid salt of which forms needles.

5. 2-p-hydroxyphenylthiazole-4-ethylamine of the formula:

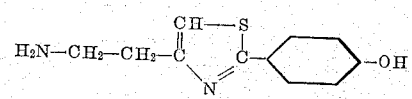

which boils at 218-222° C.

TREAT B. JOHNSON.